(No Model.)
W. POPP.
DEVICE FOR SLICING VEGETABLES.
No. 323,960. Patented Aug. 11, 1885.
Fig 1.
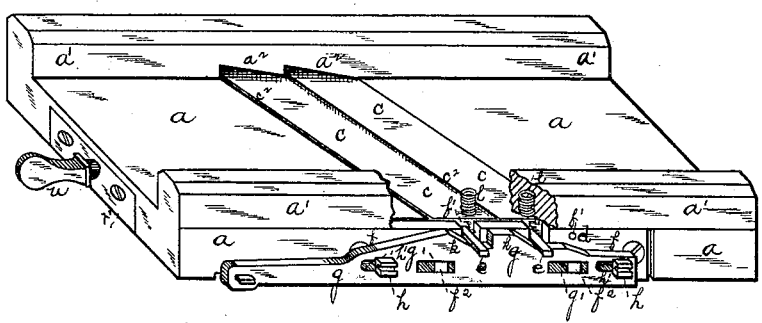
Fig 2.
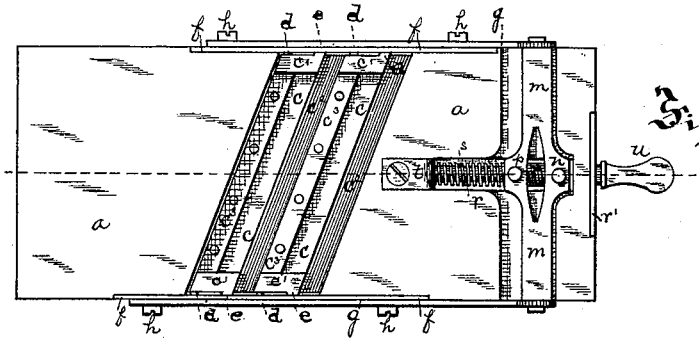
Fig 7.
Fig 3.
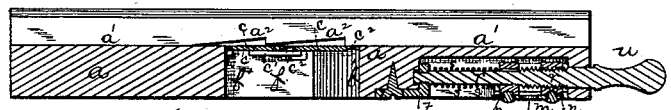
Fig 6.
Fig 5.
Fig 4.
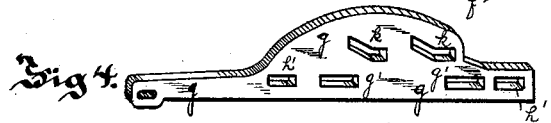
Witnesses.
Jn Cooke
F. N. Fitter
Inventor.
William Popp
By James I. Kay
Attorney
N. PETERS. Photo-Lithographer, Washington, D. C.

UNITED STATES PATENT OFFICE.

WILLIAM POPP, OF PITTSBURG, PENNSYLVANIA.

DEVICE FOR SLICING VEGETABLES.

SPECIFICATION forming part of Letters Patent No. 323,960, dated August 11, 1885.

Application filed November 3, 1884. (No model.)

*To all whom it may concern:*

Be it known that I, WILLIAM POPP, of Pittsburg, in the county of Allegheny and State of Pennsylvania, have invented a new and useful Improvement in Vegetable-Cutters; and I do hereby declare the following to be a full, clear, and exact description thereof.

My invention relates to apparatus for cutting or slicing cabbage, potatoes, and other vegetables, its object being to provide a vegetable-cutter which can be adjusted to cut any thickness of slice desired by means of a screw, and without the removal of the knives from the cutter.

It consists, essentially, in the combination of one or more knives pivoted in the cutter-board, and provided with lugs at the ends thereof, sliding plates at the sides having inclined ways, on which said lugs on the knives fit, and means for moving the knives so as to raise or lower said knives, and so adjust them the desired distance above the cutter-board.

It also consists in certain details of construction, as hereinafter fully described.

To enable others skilled in the art to make and use my invention, I will describe its construction and operation, referring to the accompanying drawings, in which—

Figure 1 is a perspective view of my improved vegetable-cutter. Fig. 2 is a bottom view thereof. Fig. 3 is a longitudinal central section, and Figs. 4, 5, 6, and 7 are detail views of the different parts.

Like letters of reference indicate like parts in each.

The cutter-board $a$ is made of any desired size, and has the opening $b'$, through which the vegetables cut or sliced fall into a suitable receptacle below, this opening generally extending diagonally across the board, because it requires less force to slice the vegetables when the knives extend diagonally across the board. The cutter-board may, if desired, be made in two pieces, secured together by the guide-plates $f$, hereinafter referred to. The shape of the knives, $c$, employed is fully illustrated in Figs. 6 and 7, the knives having the ribs $c'$ extending back from the cutting-edge $c^2$ along each end, to support the pivot-pins $d$ and lugs $e$, and the knives being pivoted by means of these pins $d$ in the guide-plates $f$, rigidly secured along the sides of the cutter-board $a$, while the lugs $e$ rest within the seats $f'$ of said plates and extend beyond said seats into the course of the sliding plates $g$. The blade portion of the knives is formed of a thin steel blade, the ribs $c'$ being riveted thereto, and in order to brace and stiffen the blade and prevent its bending under pressure, I rivet to its under surface the iron strip $c^3$, the ribs $c'$ and strip $c^3$ being cast integral, and the heads of the rivets being countersunk in the steel blade. The sliding plates $g$ are provided with slots $g'$, fitting over guide-lugs $f^2$ on the plates $f$, and are secured in place by bolts or screws $h$, passing through the slots $h'$ in the plate. The plates $g$ have inclined ways $k$, over or within which the lugs $e$ on the knives $c$ extend, so that as the plates $g$ are moved forward and backward the edges of the knives are raised and lowered, the knives swinging on the pivot-pins $d$. The sliding plates may either be formed as shown in Fig. 1 or as in Fig. 4, in the former case the knives being pressed down by the springs $l$ in the side guards, $a'$, of the cutter-board, and the spring being compressed as the edges of the knives are raised by inclined ways $k$ of the sliding plates. In the latter case, the inclined ways have the form of slots in the plates, and the lugs $e$ of the knives travel up and down in these covered ways, and are prevented from rising by the top walls of the slots. The side guards, $a'$, are cut away, as at $a^2$, to allow the knives to rise as high as necessary, according to the position in which they are adjusted. The sliding plates $g$ extend forward and fit over the ends of the plate $m$, extending across the board $a$ within a seat cut for its reception in the board, and this plate has rigidly secured to it the nut $n$ and the bearing $p$, the threaded bolt $r$ screwing into the nut and passing through the bearing, the bolt $r$ being journaled in the end plate, $r'$, and only a portion thereof being threaded, the remainder of the bar being cylindrical and of smaller diameter than the threaded portion, and extending through the bearing $p$, and having the coiled spring $s$ fitting over it and pressing against the bearing $p$. At the end of the bar is an annular depression fitting within a slot in the yoke or pivot plate $t$, thus supporting this end of the bar and preventing longitudinal movement thereof. The bar $r$ is provided with the thumb-piece $u$, thus causing it to screw through the nut $n$ on the cross-plate $m$, and cause its movement forward or backward, thus causing a like movement of the sliding plates $g$, and raising or lowering the forward edges of the knives. The knives can thus be adjusted to cut any thickness of slice, from the thickness of card-board to one-half inch, the lugs $d$ fitting over or within the inclined ways $k$ and traveling up and down the same, thus adjusting the knives without requiring their removal from the cutter-board. On account of the angle or plane of the inclined ways the lugs press directly against their faces, and consequently the pressure on the knives will have no tendency to move the sliding plates. The pressure of the spring $s$ against the bearing $p$ throws the nut $n$ against the threads of the bolt $r$, and so prevents movement of the parts, except when desired. The bearing $p$ has the further advantage of preventing the wabbling of the cross-plate $m$.

The knives can be removed for sharpening by unscrewing the sliding plate and the guide-plate on one side, and require no setting when replaced.

What I claim as my invention, and desire to secure by Letters Patent, is—

1. In vegetable-cutters, the combination, with the cutter-board, of one or more knives pivoted therein, and provided with lugs at each end, and sliding plates having inclined ways, on which said lugs rest, substantially as set forth.

2. In vegetable-cutters, the combination, with the cutter-board, of the guide-plates $f$, having guide-lugs $f^2$, one or more knives pivoted therein and having lugs $e$, and the sliding plates $g$, having slots fitting over the guide-lugs $f^2$, and having inclined ways $k$, substantially as and for the purposes set forth.

3. In vegetable-cutters, the combination, with the cutter-board, of one or more knives pivoted therein, and having lugs $e$, the sliding plates $g$, having inclined ways $k$, and the springs $l$, substantially as and for the purposes set forth.

4. In vegetable-cutters, the combination, with the cutter-board having one or more knives pivoted therein, and the sliding adjusting-plates, of the cross-plate $m$, nut $n$, and screw-bolt $r$, substantially as and for the purposes set forth.

5. In vegetable-cutters, the combination, with the cutter-board having one or more knives pivoted therein, and the sliding adjusting-plates, of the cross-plate $m$, carrying the nut $n$ and bearing $p$, the partially-threaded bolt $r$, spring $s$, and pivot-plate $t$, substantially as and for the purposes set forth.

6. The knife for vegetable-cutters, formed of the side ribs, $c'$, and strip $c^3$, formed in one piece, and the thin steel blade riveted thereto, substantially as and for the purposes set forth.

In testimony whereof I, the said WILLIAM POPP, have hereunto set my hand.

WILLIAM POPP.

Witnesses:
JAMES I. KAY,
J. N. COOKE.